Nov. 15, 1955      S. D. POOL      2,723,668
CANE STALK CHOPPER AND LEAF STRIPPING MECHANISM
Original Filed July 6, 1951
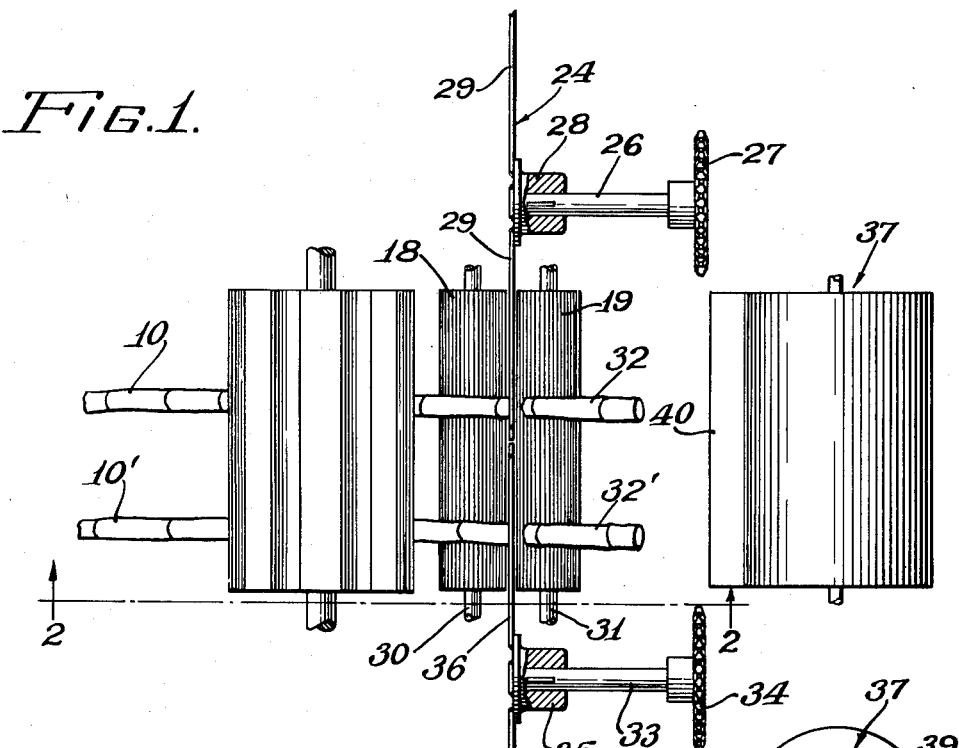
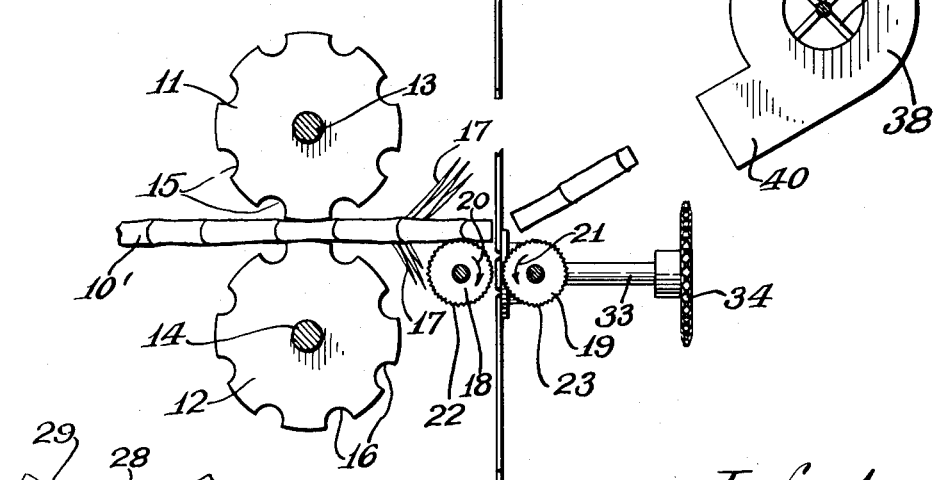
Inventor:
Stuart D. Pool

United States Patent Office 2,723,668
Patented Nov. 15, 1955

2,723,668

CANE STALK CHOPPER AND LEAF STRIPPING MECHANISM

Stuart D. Pool, Moline, Ill., assignor to International Harvester Company, a corporation of New Jersey Original application July 6, 1951, Serial No. 235,441. Divided and this application May 20, 1953, Serial No. 356,164

6 Claims. (Cl. 130—31)

This invention relates to a new and improved cane stalk chopper and leaf stripping mechanism which is a division of my copending application, Serial No. 235,441, filed July 6, 1951.

An important object of this invention is to provide in combination cooperative leaf stripping rolls in combination with a knife cutter arranged and constructed to be propelled through the juncture between the cooperative rolls whereby when cane stalks are fed across the leaf stripping rolls the knife cuts the stalk into short lengths and simultaneously pushes the tough leaves down in between the cooperative leaf stripping rolls.

Another important object of this invention is the provision of means in a cane harvesting machine wherein full-length unstripped stalks are passed horizontally over cooperative leaf stripping rolls in combination with rotating knife elements positioned at each end of the cooperative leaf stripping rolls and adapted to have blades extend inwardly to a position adjacent the center of the rolls and the blades passing downwardly between the cooperative rolls to simultaneously cut the cane stalks into short lengths as they are fed across the rolls and strip the leaves from the stalks so that the machine delivers short lengths of clean cane stalks.

A still further important object of this invention is to supply in a cane stalk cutting and stripping machine a blower for the purpose of maintaining stripped green leaves in position over cooperative stripping rolls for discharge from the machine.

Another important object of this invention is to utilize the inwardly extending portions of spaced apart rotating choppers for effecting the cutting of the cane into short lengths and also stripping leaf material therefrom.

Other and further important objects of this invention will become apparent in the following specification and accompanying drawing.

The problem of removing cane leaves and trash from the cane stalks has long been present in the cane industry. The harvesting of cane stalks whether accomplished by hand or machine has in the past meant the bringing in of full length unstripped cane stalks. Thereafter the leaves would have to be stripped from the stalks and finally the stalks would be cut in short lengths. There has been no easy and generally acceptable way of performing the cane leaf stripping job. The stripping device of the present application employs cooperative stripping rolls which are common to many agricultural implements and in combination therewith employs a knife mechanism which by reason of the physical characteristics of the cane leaves will deliver the leaves to and through the cooperative stripping rolls without in fact cutting the leaves. The knife cutters are propelled through the juncture between the cooperative stripping rolls as the stalks are fed across the rolls. The knives perform two functions simultaneously; first, they cut the cane stalks into short lengths; and, second, the stalk leaves are stripped from the stalk by reason of the action of the knife mechanism in combination with the cooperative stripping rolls. It is thus obvious that the device of this invention may be used directly on a field cane harvesting machine or may be used as a separate stationary unit to which previously harvested unstripped cane stalks may be delivered.

In the drawing:

Fig. 1 is a top plan view of the cane leaf stripper and stalk chopper of this invention.

Fig. 2 is a sectional view taken on the line 2—2 of Fig. 1.

Fig. 3 is an end view of one of the knife mechanisms of this invention.

As shown in the drawing:

The reference numerals 10 and 10' indicate generally a plurality of cane stalks which may be delivered directly from field harvesting devices positioned forwardly of the stripper and chopper of this invention or which may be fed to the present machine after having been previously harvested. Cooperative feed rolls 11 and 12 are mounted on shafts 13 and 14 which are driven at a uniform relatively fast speed and are disposed in vertical alignment as best shown in Fig. 2 of the drawing. The peripheral surfaces of the rolls 11 and 12 are preferably corrugated as shown at 15 and 16 respectively. The stalks 10 are thus forcibly fed at a constant high rate of speed in a horizontal plane to a position rearwardly of the feed rolls 11 and 12. The stalks with their leaf foliage designated by the numeral 17 are thus moved over a pair of cooperative leaf stripping rolls 18 and 19. These rolls 18 and 19 rotate inwardly and downwardly as indicated by the arrows 20 and 21. The rolls 18 and 19 are further provided with serrated or corrugated circumferential surfaces 22 and 23 respectively for the purpose of better gripping the green cane leaves to pull them downwardly and strip them from the stalks 10.

Cutter mechanisms 24 and 25 are provided at both ends of the stripping rolls 18 and 19. The cutter mechanism 24 includes a shaft 26 driven by means of a sprocket 27 and carrying a rotor hub 28. The hub is provided with a plurality of radially extending spaced apart knife blades 29 as best shown in Fig. 3. The knife blades 29 are thus rotated in a plane lying parallel to the cooperative stripping rolls 18 and 19 and to the respective shafts 30 and 31 of these rolls. The rolls 18 and 19, as shown in both Figs. 1 and 2, are longitudinally spaced apart sufficiently to permit the passage of the knife elements 29 therebetween. The knives 29 are propelled at a considerable speed through the juncture between the rolls 18 and 19 and as shown in the drawing the stalks 10 are severed forming short lengths 32.

Similarly the knife mechanism 25 is provided with a shaft 33 driven by a sprocket 34 and provided with a rotor hub 35. Radially extending knife elements 36 are comparable to the knife elements 29. These knives 36 rotate in a plane parallel to the rolls 18 and 19 and complement the knives 29 of the knife mechanism 24 covering substantially the full length of the rolls 18 and 19. Each of the knife mechanisms 24 and 25 covers half of the length of the rolls 18 and 19 and thus the stalks 10 on one side of the rolls will be cut by the knife elements 29 and the stalks 10' disposed on the other side of the rolls 18 and 19 will be cut by the knife elements 36 to thus deliver short lengths of cut stalk designated by the numeral 32'. It should be understood that the cutting mechanisms 24 and 25 have their blades 29 and 36 rotating inwardly and downwardly through the space between the rolls 18 and 19. It is preferable in this form of the invention that these knives be timed to simultaneously pass through the cooperative rolls 18 and 19 to effect a cutting of all the stalks lying on and over the rolls.

In addition to the cutting of the stalks into short lengths 32 and 32', it is a principal function of the knives 29 and 36 to drive and/or push the tough green cane leaves and/or dry cane leaves downwardly through the rolls 18 and 19 to thus strip the leaves from the stalks 10 and 10'. The cane leaves 17, as previously stated, are tough and leathery so that the knives will not generally cut up the leaves but will usually bend them down through the rolls 18 and 19 whereupon the serrated surfaces of the cooperative rolls 18 and 19 pick up the leaves and help the stripping thereof from the stalks.

A blower 37 includes a housing 38, a fan 39 and a tangential delivery spout 40. A continuous blast of air is delivered through the spout 40 and impinges in a direction downwardly and forwardly over the cooperative stripping rolls 18 and 19 in such a manner that any loose leaves or trash which might fall forwardly over the rolls will be returned by the blast of air to the juncture between the rolls whereupon the cooperation of the knives 29 and 36 will insure delivery of the leaves and trash downwardly through the rolls for discharge thereof. This air blast is sufficiently strong to blow back any "leaf roll" which may be thrown across the stripper mechanism.

In the operation of the machine, cane stalks are fed to the feeding rolls 11 and 12 whereupon the rolls with their corrugated peripheries feed the stalks rearwardly at a constant relatively fast rate of speed over the stripping and cutting mechanism of this invention. Thereafter the combined action of the cooperative stripping rolls 18 and 19, in conjunction with the knife members 29 and 36, cuts the stalks into short lengths and simultaneously strips the stalks of all leaf and trash material. This results in clean uniform short lengths of cane stalks immediately ready for delivery to refinery mills or the like. It is obvious that the length of stalk pieces may be regulated by varying the speed of the feed rolls and/or varying the speed of rotation of the knife members.

Numerous details of construction may be varied throughout a wide range without departing from the principles disclosed herein, and I therefore do not propose limiting the patent granted hereon otherwise than as necessitated by the appended claims.

What is claimed is:

1. A cane stalk cutter and leaf stripping machine comprising horizontally disposed inwardly and downwardly rotatable cooperative leaf stripping parallel rolls having their peripheral surfaces spaced apart, means for feeding unstripped longitudinally disposed cane stalks over said cooperative leaf stripping rolls at right angles thereto, rotating knife means disposed at each end of said cooperative leaf stripping rolls, each of said rotating knife means including at least one blade member for passing between the spaced apart peripheral surfaces of the cooperative leaf stripping rolls, and said blade members being of a length approximately half the length of the cooperative leaf stripping rolls whereby when one of the blade members passes between the rolls it extends approximately half the length of said rolls.

2. A device as set forth in claim 1 in which each rotating knife means includes a rotor member and radially extending knife blades fastened to said rotor and adapted to successively pass between the spaced apart cooperative leaf stripping rolls, the blades of each of said knife means complementing each other to make the cutting surface extend over the full length of the cooperative leaf stripping rolls.

3. A device as set forth in claim 2 in which the means for feeding includes a pair of cooperative feeding rolls.

4. A cane stalk cutter and leaf stripping machine comprising inwardly and downwardly rotating cooperative leaf stripping rolls, said cooperative leaf stripping rolls being transversely disposed and lying in a horizontal plane, said cooperative leaf stripping rolls being only slightly spaced apart in a longitudinal direction, knife means positioned at the side of said rolls and adapted to be driven transversely of the machine through the slight longitudinal space between the cooperative leaf stripping rolls, and means for feeding cane stalks longitudinally across the transversely disposed leaf stripping rolls whereby the knife means cuts the stalks into short lengths and feeds the leaf material of the cane stalks downwardly and through the leaf stripping rolls.

5. A device as set forth in claim 4 in which the means for feeding the cane stalks comprises a pair of cooperative vertically spaced feed rolls and the feed rolls being rotatably driven at a uniform speed to effect a constant and uniform feeding of cane stalks across the cooperative leaf stripping rolls.

6. A device as set forth in claim 4 in which a blower means is provided at a position back of the cooperative leaf stripping rolls opposite the feed rolls and is arranged and constructed to direct a blast of air forwardly and downwardly over said cooperative leaf stripping rolls.

References Cited in the file of this patent

UNITED STATES PATENTS

| | | |
|---|---|---|
| 353,737 | Dolan | Dec. 7, 1886 |
| 1,138,300 | Letin et al. | May 4, 1915 |
| 1,797,638 | Collins et al. | Mar. 24, 1931 |
| 2,208,787 | Brown | July 23, 1940 |
| 2,377,443 | Pallmann | June 5, 1945 |